Patented July 29, 1952

2,605,277

UNITED STATES PATENT OFFICE 2,605,277

2,4-DINITRO-6-ALKYLPHENYL p-CHLOROBENZENE SULFONATES

Fred E. Boettner, Philadelphia, and Willard J. Croxall, Bryn Athyn, Pa., assignors to Rohm & Haas Company, Philadelphia, Pa., a corporation of Delaware No Drawing. Application March 21, 1950, Serial No. 151,038

6 Claims. (Cl. 260—456)

This invention relates to 2,4-dinitro-6-alkylphenyl p-chlorobenzene sulfonates in which the alkyl group contains six to nine carbon atoms and is attached to the phenyl ring at a secondary carbon atom.

It also relates to the process by which these compounds are prepared and to parasiticidal compositions containing these sulfonates as the essential active agent.

These compounds are prepared by reacting by mixing together a 2,4-dinitro-6-alkylphenol in the form of an alkali metal salt with p-chlorobenzenesulfonylchloride and separating the resulting sulfonate. The reaction is accelerated and completed by heating the reaction mixture. Temperatures from 30° to 75° C. are suitable. The sulfonate is separated from salt and phenolate by treating with water. The products are oils at normal temperatures.

As dinitroalkylphenols there are used compounds of the formula

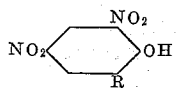

where R is a secondary alkyl group of six to nine carbon atoms. R may thus be hexyl, heptyl, octyl, or nonyl in the various isomeric forms. The preparation of these dinitroalkylphenols may start with phenol itself which is reacted with an alcohol or olefine of six to nine carbon atoms in the presence of an acidic condensing agent, such as an acid clay, an organic sulfonic acid, sulfuric acid, boron trifluoride, or hydrogen fluoride. The principal product is an o-alkylphenol, which can be purified by vacuum distillation. This compound is dinitrated. The o-alkylphenol may be treated with nitric acid or it may be treated with sulfuric acid and then nitric acid.

By way of illustration of the former method of nitration 178 parts by weight of o-sec.-hexylphenol (from 1-hexene and phenol) is taken up in 400 parts by weight of ethylene dichloride and slowly treated with 225 parts of 70% nitric acid in a temperature range of 25°–35° C. The reaction mixture is stirred for several hours after addition of acid has been completed. It is then washed twice with water and the solvent evaporated under reduced pressure. The residue is chiefly 2,4-dinitro-6-hexylphenol with some mononitrohexylphenol. In the same way sec.-heptylphenols, sec.-octylphenols, and sec.-nonylphenols may be dinitrated and the reaction products obtained used for the preparation of the chlorobenzene sulfonates.

Purer dinitrated phenols are obtained by a nitration method in which the alkylphenol is first sulfonated. This method is illustrated with the following typical preparation. While this illustration is based on o-caprylphenol, the method with conventional allowances for differences in molecular weights can be applied to other sec.-alkylphenols.

To 206 parts by weight of o-caprylphenol (from phenol and capryl alcohol) there is added with good stirring at 35° C. 294 parts of 98% sulfuric acid over a period of 30 minutes. There is then added over a period of 45 minutes 162 parts of water with the temperature still held at 35° C. This mixture is then slowly added to 340 parts of 60% nitric acid at 20° C. The temperature of the resulting mixture is raised to 35° C. and stirring is continued for three hours. The mixture is allowed to stand to form layers. The spent acid is withdrawn and discarded. The organic layer is washed three times with portions of water, about 150 parts per portion being sufficient. The material is then stripped under low pressure. The product obtained is 2,4-dinitro-6-caprylphenol.

This method applied to other o-alkylphenols yields 2,4-dinitro-6-sec.-hexylphenol, 2,4-dinitro-6-sec.-heptylphenol, 2,4-dinitro-6-sec.-octylphenol, or 2,4-dinitro-6-sec.-nonylphenol.

Any of these dinitroalkylphenols is converted to the desired p-chlorobenzene sulfonate by converting a phenol to its alkali metal phenate and reacting this with p-chlorobenzenesulfonylchloride. The reaction can be started at 15° to 30° C. and completed by warming at temperatures of 50° to 90° C. The product is readily separated by treating the reaction mixture with water. The washing of the desired product may be aided by taking up the crude dinitroalkylphenyl chlorobenzene sulfonate in a water-immiscible, volatile organic solvent. Upon evaporation of the solvent the desired 2,4-dinitro-6-alkylphenyl chlorobenzene sulfonates are obtained.

Examples of the preparation of typical 2,4-dinitro-6-alkylphenyl benzene sulfonates follow. Parts are by weight.

*Example 1*

In a reaction vessel equipped with thermometer, stirrer, and reflux condenser there is placed 175 parts of ethyl alcohol denatured with benzene, 170 parts of water, and 148.2 parts of 2,4-dinitro-6-caprylphenol. Thereto over a period of ten minutes there is added with cooling 40 parts of a 50% sodium hydroxide solution. While this charge is stirred and cooled, there is added slowly at 20°-25° C. 122.1 parts of p-chlorobenzenesulfonylchloride. The reaction mixture is then stirred and heated up to 60° C. for two hours. The reaction mixture is cooled to about 25° C. and poured into 1000 parts of cold water. A heavy dark red oil separates. It is washed with water after being taken up in about 250 parts of ethylene dichloride. Washing is repeated four times. The solvent solution is then warmed on a steam bath under reduced pressure and the solvent removed. The residue is fairly pure 2,4-dinitro-6-caprylphenyl p-chlorobenzene sulfonate,

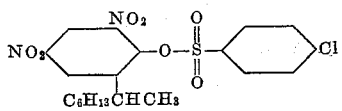

The chlorine content of this product is 7.9% (theory 7.5%) and the saponification number is 236 (theory 238).

*Example 2*

There is placed in a reaction flask equipped with stirrer, reflux condenser, and thermometer 200 parts of isopropanol, 175 parts of water, and 155 parts of a 2,4-dinitro-6-sec.-nonlyphenol (from phenol and isononenes). Forty parts of a 50% sodium hydroxide solution is slowly added with cooling to limit the temperature rise to 3° C. There is then slowly added with stirring and cooling 122 parts of p-chlorobenzenesulfonylchloride. The mixture is stirred and heated at 50°-60° C. for two hours, cooled, and poured into cold water. There separates an oil, which is collected and taken up in ethylene dichloride. This solvent solution is washed four times with 200 part portions of water. The solvent is evaporated by gentle heating under reduced pressure. The product corresponds in composition to 2,4-dinitro-6-nonylphenyl p-chlorobenzene sulfonate. The product as obtained is a dark red oil.

*Example 3*

The procedure described above is followed with 134 parts of 2,4-dinitro-6-sec.-hexylphenol, 170 parts of ethanol, 160 parts of water, 40 parts of 50% sodium hydroxide solution, and 122 parts of p-chlorobenzenesulfonylchloride. The product is a red oil which contains 8.1% of chlorine and 7.0% of sulfur. Theoretical values are 8.0% and 7.2% respectively.

*Example 4*

The same procedure is applied to 141 parts of 2,4-dinitro-sec.-heptylphenol (obtained by dinitration of o-heptylphenol from phenol and 3-heptanol). The product is entirely similar in appearance and general properties to the other sulfonates. It has the structure.

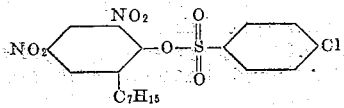

where $C_7H_{15}$ is secondary.

Test data with the above 2,4-dinitro-6-alkylphenyl p-chlorobenzene sulfonates show them to be highly effective insecticidal agents. They are excellent miticides, very good stomach poisons, and fairly good aphicides. They give, for example, 100% kill of red spiders when applied in sprays at 1 to 400 dilution. Kills of aphids are 90% to 95% at 1 to 400 dilution. Kills of bean beetle larvae are 75% to 90% when the compounds are applied in sprays at 1 to 100. The army worm suffers 100% kill at 1 to 100 (8 lbs. per 100 gallons).

The compounds of this invention may be formulated for sprays or for dusts with the aid of a diluent or carrier. A compound may be taken up in a finely divided solid by dissolving the compound in a volatile solvent, mixing solid and solution, and evaporating the solvent. A compound may also be taken up in a porous solid merely by mixing. A compound may be dissolved in a liquid carrier together with an emulsifying agent. The preparations may contain wetting, dispersing, and sticking agents and be used in conjunction with other insecticidal agents or with fungicides.

As finely divided solid, there may be used talc, clay, magnesium carbonate, diatomaceous earth, pyrophyllite, lignocellulosic flours, and the like. Frequently, mixtures of such solids are desirable.

As solvents for use in preparing emulsifiable compositions, there may be used pine oil, cyclohexanol, other alcohols including ether alcohols, such as butoxyethanol or butoxyethoxyethanol, petroleum oils, etc. As emulsifying agents there may be used triethanolamine oleate, alkylphenoxypolyethoxyethanols, sulfonated oils, fatty acid-polyglycerol condensates, etc. Many of the emulsifying agents can be mixed with the solvent solution of the toxicant so that a self-emulsifying composition results.

Dusts may contain about one-half to ten percent of one or more of the 2,4-dinitro-6-alkylphenyl chlorobenzene sulfonates above defined. Sprays may be made from compositions of one of these sulfonates on a solid or from an emulsifiable composition upon extension with water.

Some typical compositions follow:

A

1 part toxicant
1 part spreader-sticker
8 parts magnesium carbonate
8 parts clay
2 parts calcium silicate

B

20 parts toxicant
78 parts clay
1 part octylphenoxypolyethoxyethanol
1 part condensed sodium naphthalene sulfonate

C

5 parts toxicant
1 part dispersing agent
1 part spreader-sticker
93 parts clay

D

1 part toxicant
1 part octylphenoxypolyethoxyethanol
2 parts methylated naphthalene or pine oil A composition was prepared from 2,4-dinitro-6-caprylphenyl p-chlorobenzene sulfonate according to formula B and applied to plants infested with the army worm in a series of concentrations. After 24 hours the plants were observed and counts made. At 4 lbs. of toxicant per 100 gallons a kill of 97% was obtained; at 2 lbs. per 100 gallons, 100%; at 1 lb. per 100 gallons, 100%; and at 0.5 lb. per 100 gallons, 67%.

Sprays from this formulation of the compound were also applied to bean plants infested with black bean aphids. At 1 lb. per 100 gallons the kill was 60%.

Plants infested with a two-spotted mite were sprayed at concentrations of the same compound in Formula D of 1:800, 1:1600, and 1:3200. Kills were found as 99.7%, 98.5% and 88% respectively.

Plants infested with red spider were sprayed with the same compound in Formula D at 1:1800 to 1:3200. At each level 100% control was obtained.

A 5% dust of the same compound was applied to plants infested with red spider. Again, 100% control was obtained.

A spray containing dinitrocaprylphenyl chlorobenzene sulfonate was applied to plants infested with army worm with the following results: at 4 lbs. per 100 gallons, 93% control; at 2 lbs., 83% control; at one lb., 73% control; and at 0.5 lb., 53% control.

Similar results are obtained whether the alkyl group be hexyl, heptyl, octyl, or nonyl provided that these groups are in the 6-position and are secondary.

The data reported below are typical of those obtained with these compounds when examined at successive dilutions.

A wettable powder was prepared by mixing 25 parts of 2,4-dinitro-6-caprylphenyl p-chlorobenzene sulfonate and 3 parts of condensed naphthalene sodium sulfonate with 15 parts of a bentonitic clay, and then extending this mixture with 57 parts of a finely particled kaolin. This powder was mixed with water in the following proportions of active agent: 4 lbs. per 100 gallons, 2 lbs. per 100 gallons, one lb. per 100 gallons, and 0.5 lb. per 100 gallons. The percentage of controls were 97%, 100%, 100%, and 67% respectively against the army worm.

At 0.5 lb. of this powder per 100 gallons and 0.25 lb. per 100 gallons controls of 100% were obtained against red spider.

The 25% powder was extended with pyrophyllite to 5% of the toxicant and applied as a dust. A 100% control of red spider was likewise obtained.

A self-emulsifying concentrate was prepared from 25 parts of 2,4-dinitro-6-caprylphenyl p-chlorobenzene sulfonate, 6 parts of mixed alkylphenoxypolyethoxyethanols, and 69 parts of methylated naphthalenes. This preparation was added to water and sprayed on plants infested with two-spotted mites. The following kills were found: at 1:800, 99.7%; at 1:1600, 98.5%; and at 1:3200, 88%. Sprays against red spiders gave the following kills: at 1:400, 100%; at 1:800, 100%; at 1:1600, 100%; and at 1:3200, 100%.

We claim:

1. Chemical compounds of the formula

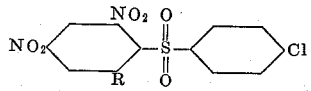

wherein R is a secondary alkyl group of six to nine carbon atoms.

2. A compound of the formula of claim 1 wherein R is a hexyl group.

3. A compound of the formula of claim 1 wherein R is a heptyl group.

4. A compound of the formula of claim 1 wherein R is a nonyl group.

5. A compound of the formula of claim 1 wherein R is an octyl group.

6. A compound according to claim 5 wherein the secondary octyl group is the capryl group,

FRED E. BOETTNER.
WILLARD J. CROXALL.

REFERENCES CITED

The following references are of record in the file of this patent:

UNITED STATES PATENTS

| Number | Name | Date |
|---|---|---|
| 2,134,642 | Petitcolas et al. | Oct. 25, 1938 |
| 2,148,928 | Meuron | Feb. 28, 1939 |
| 2,499,396 | Lynn | Mar. 7, 1950 |

FOREIGN PATENTS

| Number | Country | Date |
|---|---|---|
| 235,598 | Great Britain | Oct. 1, 1925 |

OTHER REFERENCES

Lauger et al.: "Helvetica Chimica Acta," vol. 27, 1944, pages 892 and 903.